United States Patent
Kurokawa et al.

[11] Patent Number: 6,066,587
[45] Date of Patent: May 23, 2000

[54] CATALYST FOR PURIFYING EXHAUST GAS

[75] Inventors: Takahiro Kurokawa, Hiroshima; Akihide Takami, Furuenishi-machi; Hideharu Iwakuni, Higashihiroshima; Makoto Kyogoku; Kenji Okamoto, both of Hiroshima; Hiroshi Yamada, Hatsukaichi, all of Japan

[73] Assignee: Mazda Motor Corporation, Hiroshima-Ken, Japan

[21] Appl. No.: 08/937,175

[22] Filed: Sep. 25, 1997

[30] Foreign Application Priority Data

Sep. 26, 1996 [JP] Japan .................................... 8-254870
Sep. 9, 1997 [JP] Japan .................................... 9-243677

[51] Int. Cl.$^7$ .................................................... B01J 29/04
[52] U.S. Cl. ................................ 502/66; 502/64; 502/74; 502/60; 502/326; 502/328; 502/331
[58] Field of Search ................................ 502/60, 64, 66, 502/100, 102, 103, 230, 261, 415, 427, 439, 74, 326, 328, 331, 166; 427/450, 453, 454, 455, 456; 106/1.05, 1.12, 1.15, 1.21, 1.24, 1.25, 1.27, 1.28

[56] References Cited

U.S. PATENT DOCUMENTS

| | | | |
|---|---|---|---|
| 4,048,098 | 9/1977 | Koberstain et al. | 252/432 |
| 4,102,813 | 7/1978 | Kimura et al. | 252/430 |
| 4,162,235 | 7/1979 | Acres et al. | 252/462 |
| 4,169,814 | 10/1979 | Inaba et al. | 252/441 |
| 4,294,726 | 10/1981 | Bozon et al. | 252/462 |
| 4,378,307 | 3/1983 | Brunelle et al. | 252/455 R |
| 4,923,842 | 5/1990 | Summers | 502/261 |
| 5,179,059 | 1/1993 | Domesle et al. | 502/303 |
| 5,278,113 | 1/1994 | Ono et al. | 502/66 |
| 5,338,715 | 8/1994 | Iida et al. | 502/64 |
| 5,354,720 | 10/1994 | Leyrer et al. | 502/64 |
| 5,422,333 | 6/1995 | Kano et al. | 502/60 |
| 5,439,865 | 8/1995 | Abe et al. | 502/333 |
| 5,489,561 | 2/1996 | Iwakuni et al. | 502/66 |
| 5,543,124 | 8/1996 | Yokota et al. | 423/239.1 |
| 5,571,763 | 11/1996 | Takamoto et al. | 502/334 |
| 5,610,117 | 3/1997 | Horiuchi et al. | 502/324 |
| 5,643,543 | 7/1997 | Guibard et al. | 423/213.5 |
| 5,753,580 | 5/1998 | Hayashi et al. | 502/304 |
| 5,795,840 | 8/1998 | Takami et al. | 502/327 |
| 5,804,152 | 9/1998 | Miyoshi et al. | 423/213.5 |
| 5,849,254 | 12/1998 | Suzuki et al. | 423/213.5 |
| 6,004,521 | 12/1999 | Miyoshi et al. | 423/213.5 |

FOREIGN PATENT DOCUMENTS

| | | | |
|---|---|---|---|
| 5-68888 | 3/1993 | Japan | B01J 29/28 |
| 7-24333 | 1/1995 | Japan | B01J 37/02 |
| 7-108172 | 4/1995 | Japan | B01J 23/58 |

*Primary Examiner*—Tom Dunn
*Assistant Examiner*—Cam N. Nguyen
*Attorney, Agent, or Firm*—Sidley & Austin; Hugh A. Abrams

[57] ABSTRACT

A catalyst has a base catalyst layer containing platinum and barium as precious metal supported by alumina and an over catalyst layer containing platinum and rhodium as precious metal supported by zeolitr. The platinum and rhodium in the over catalyst layer activate NOx and HC so as to make them more reactive in terms of energy, and the barium in the base catalyst layer makes the platinum be more dispersive in the base catalyst layer. Under the existence of dispersive platinum, NOx in exhaust gas is decomposed and purified by reaction with reactive $NO_2$ and partially oxidized HC generated in the over catalyst layer.

16 Claims, 9 Drawing Sheets

FIG. 6

| | | COMPOSITION | | | | | | NOx PURIFICATION RATE (%) | |
|---|---|---|---|---|---|---|---|---|---|
| | | OVER LAYER | | | BASE LAYER | | | | |
| | | BASE MATERIAL | Pt (g/l) | Rh (g/l) | BASE MATERIAL | Pt (g/l) | Rh (g/l) | Ba (g/l) | FRESH | AGED |
| EXAMPLE | I | ZEOLITE (MFI-TYPE) 5Wt% | 2.3 | — | ALUMINA + CERIA (1:1) 40 wt% | 2.0 | — | 30 | 45 | 22 |
| | II | | 2.0 | 0.1 | | 2.0 | — | 30 | 47 | 24 |
| | III | | 2.0 | — | | 2.0 | 0.01 | 30 | 40 | 20 |
| | IV | | 0.3 | — | | 2.0 | — | 30 | 40 | 18 |
| | V | | 2.3 | — | ALUMINA 40 wt% | 2.0 | — | 30 | 43 | 23 |
| COMPARATIVE SAMPLE | | | 2.3 | — | ALUMINA + CERIA (1:1) 40 wt% | 2.0 | — | — | 16 | 5 |

FIG. 7

| | |
|---|---|
| HC | 4,000ppmC |
| NO | 250ppm |
| CO | 0.15% |
| $CO_2$ | 7.7% |
| $H_2$ | 150ppm |
| $O_2$ | 7% |
| $N_2$ | REMNANT |

FIG. 8

| BASE LAYER | ALUMINA + CERIA | ZEOLITE | | |
|---|---|---|---|---|
| | | MFI TYPE | Y TYPE | β TYPE |
| OVER LAYER | ZEOLITE (MFI TYPE) | | | |
| NOx PURIFICATTION RATE (%) | 45 | 40 | 37 | 39 |

FIG. 9

| | NOx PURIFICATION RATE(%) | |
|---|---|---|
| OVER LAYER | FRESH | AGED |
| ZEOLITE(MFI TYPE) | 45 | 22 |
| ZEOLITE + CERIA | 43 | 21 |
| ZEOLITE + ALUMINA | 44 | 20 |
| ALUMINA | 45 | 16 |
| CERIA | 40 | 14 |

FIG. 10

| AMOUNT OF Pt IN OVER LAYER (g/l) | NOx PURIFICATION RATE (%) | |
|---|---|---|
| | FRESH | AGED |
| 0 | 2 | 0 |
| 0.3 | 12 | 1 |
| 0.5 | 25 | 11 |
| 1.0 | 30 | 16 |
| 1.5 | 40 | 17 |
| 2.0 | 45 | 22 |
| 3.0 | 47 | 24 |
| 4.0 | 52 | 16 |
| 6.0 | 53 | 12 |
| 8.0 | 54 | — |
| 10.0 | 54 | — |
| 15.0 | 55 | — |

FIG. 11

| AMOUNT OF Pt & Pd IN BASE LAYER | | NOx PURIFICATION RATE (%) | |
|---|---|---|---|
| Pt | Pd | FRESH | AGED |
| 2 | 1.0 | 45 | 21 |
| 2 | 2.0 | 50 | 25 |
| 2 | 3.0 | 51 | 27 |
| 2 | 4.0 | 52 | 29 |
| 2 | 5.0 | 51 | 17 |
| 2 | 7.0 | 52 | 12 |

FIG. 12

| | | OVER LAYER | BASE LAYER | | NOx PURIFICATION RATE (%) | |
|---|---|---|---|---|---|---|
| | | | Pt(g/l) | Pd(g/l) | FRESH | AGED |
| EXAMPLE | As | 5 wt % Pt + Rh (75/1) ZSM5 | 2 | --- | 45 | 20 |
| | Bs | 5 wt % Pt + Rh (75/1) ZSM5 | 2 | 4 | 52 | 25 |
| | Cs | 5 wt % Pt + Rh (75/1) ZSM5 | --- | 4 | 47 | 22 |
| COMPARATIVE SAMPLE | Ac | NONE | 2 | --- | 34 | 8 |
| | Bc | NONE | 2 | 4 | 38 | 12 |
| | Cc | NONE | --- | 4 | 37 | 7 |

FIG. 13

| TOTAL AMOUNT OF WASH COAT (wt %) | NOx PURIFICATION RATE (%) —FRESH— | FLAKING RATE (%) |
|---|---|---|
| 20 | 34 | 0.5 |
| 30 | 42 | 0.7 |
| 40 | 45 | 0.8 |
| 60 | 53 | 0.9 |
| 80 | 62 | 0.9 |
| 100 | 64 | 1.0 |
| 120 | 59 | 1.2 |
| 140 | 50 | 1.7 |
| 160 | 40 | 2.4 |
| 200 | 38 | 3.2 |

FIG. 14

| | | COMPOSITION | | | | | | PURIFICATION RATE (%) (FRESH) |
|---|---|---|---|---|---|---|---|---|
| | | OVER LAYER | | | BASE LAYER | | | |
| | | BASE MATERIAL | Pt(g/l) | Rh(g/l) | BASE MATERIAL | Pt(g/l) | Rh(g/l) | Ba(g/l) | |
| EXAMPLE | Y1 | ZEOLITR (MFI TYPE) | 0.5 | 0.01 | TITANIUM OXIDE | 6 | --- | 30 | 54 |
| | Y2 | | | | ALUMINA + CERIA | | | | 56 |
| | Y3 | | | | ALUMINA | | | | 55 |

|  | A/F = 22 | λ = 1 |
|---|---|---|
| $O_2$ | 7.0% | 0.5% |
| NO | 260ppm | ← |
| HC | 4000ppmC | ← |
| CO | 1600ppm | ← |
| $CO_2$ | 9.74% | ← |
| $H_2$ | 650ppm | ← |
| $H_2O$ | 0% | ← |
| $N_2$ | REMNANT | ← |

CATALYST FOR PURIFYING EXHAUST GAS

BACKGROUND OF THE INVENTION

1. Field of the Invention

The present invention relates to a catalyst for purifying exhaust gas, and, more particularly, to a catalyst suitable for purifying oxides of nitrogen (NOx) in exhaust gas from an engine of a motor vehicle.

2. Description of Related Art

Recently, much attentions have been focused on lean-burn engines for motor vehicles which have a low fuel consumption. Such a lean-burn engine, however, generates more oxides of nitrogen (Nox) because a lean fuel mixture is burned in an excessive oxygen. Thus, there is still a demand for a catalyst suitable for purifying nitrogen oxides (Nox) more efficiently.

An example of such a catalyst, as disclosed in Japanese Unexamined Patent Publication No.7-108172, is the one that has two layers supported on a carrier, of which an base or base layer contains alumina on which alkali earth metal, such as barium, is supported and of which an over or over layer contains alumina on which platinum and rhodium are supported.

As described in Japanese Unexamined Patent Publication No.5-68888, there has been known in the art a catalyst comprising two layers coated on a carrier, one of which, namely an base layer, bearing γ-alumina supporting a precious metal or metals and another of which, namely an over layer, bearing zeolite supporting copper. Another example is a catalyst such as described in, for example, Japanese Unexamined Patent Publication No.7-24333, which comprises two layers, i.e. an base layer bearing platinum, zeolite supporting rhodium and platinum, and cerium, and an over layer bearing platinum, zeolite supporting rhodium and iridium, and cerium (or otherwise alumina).

In using a catalyst which comprises two catalyst layers on a carrier of which an base layer has a precious metal as an activated species to purify oxides of nitrogen (Nox) such as described in the above mentioned Japanese Unexamined Patent Publication No.5-68888 or No.7-24333, it is necessary to disperse the precious metal into the base layer as desired. As a practical matter, it is, however, difficult to disperse as desired, due to which a drastic improvement of NOx purification ratio is hardly obtainable. In particular, in the case that the catalyst has been exposed heat and aged, or an exhaust gas is hard to flow through the catalyst layers in an engine operation range of high engine speeds and high engine loads.

SUMMARY OF THE INVENTION

An object of the invention is to provide a catalyst for a motor vehicle of the type having precious metal contained in an base catalyst layer, which has a purification ratio of nitrogen oxides (NOx) in an exhaust gas drastically improved by means of dispersion of precious metals in the base catalyst layer which is highly increased due to specific metals additionally contained in the base catalyst layer.

The invention was based on the knowledge that alkali earth metals such as barium disclosed in Japanese Unexamined Patent Publication No.7-108172 are contributory to improvement of dispersion of precious metals in a catalyst layer. The catalyst of the invention basically comprises a base catalyst layer containing an alkaline earth metal together with platinum.

Specifically, the catalyst of the invention contains zeolite by which precious metal is supported in an over catalyst layer and at least platinum and an alkaline earth metal in a base catalyst layer. With the catalyst of the invention, the precious metal supported by zeolite in the over catalyst layer activates nitrogen oxides (NOx) and hydrocarbons (HC) in exhaust gas and then reduces NOx to nitrogen dioxide (NO$_2$) and partially oxidizes cracks HC, which become easy to react in terms of energy. Under existence of the platinum easily dispersed in the base catalyst layer due to the earth metal, NOx are decomposed and purified by means of reaction with the nitrogen dioxide (NO$_2$) and the partially oxidized HC formed in the over layer. Consequently, this reaction mechanism yields improvement of NOx purification ratio, even in the case that the catalyst encounters thermal aging or is exposed to exhaust gas from the engine operating in a range of high engine speeds high engine roads.

Catalyst containing at least platinum in the over catalyst layer promotes reaction of reducing NOx and reaction of oxidizing HC due to the platinum, providing an improved ratio of NOx purification. The precious metals in the over catalyst layer may include platinum and rhodium. The rhodium enhances the promotion of reaction of reducing NOx.

Specifically, a weight ratio of the platinum to the rhodium in the over catalyst layer is 0.3 or more, preferably between 3.2 and 75.

Catalyst of the invention may contain either one or two of alumina, ceria and zeolite for supporting the platinum in the base catalyst layer with an effect of enhancing and ensuring a high NOx purification ratio. In this instance, the amount of platinum in the base catalyst layer is between 1.0–6.0 g per one litter of the catalyst. If platinum is less than 1.0 g/l, the catalyst encounters aggravation of NOx purification ratio, in particular, after thermal aging, and if it is more than 6.0 g/l, the platinum will be sintered.

Furthermore, the catalyst of the invention may an alkaline earth metal, such as barium (Ba), in the over catalyst layer. On the other hand, the base catalyst layer may contain either palladium or rhodium in addition to platinum. The addition of either palladium or rhodium enhances the improvement of NOx high purification ratio.

BRIEF DESCRIPTION OF THE DRAWINGS

The above and other objects and features of the invention will be clearly understood from the following description when considered in conjunction with the accompanying drawings, in which:

FIG. 6 is a table showing the result of evaluation of various sample catalysts according to the invention;

FIG. 7 is a table showing compositions of simulated exhaust gas used for various evaluation tests;

FIG. 8 is a table showing the result of evaluation of effects of component materials of the catalyst;

FIG. 9 is a table showing the result of evaluation of effects of component materials in the over catalyst layer;

FIG. 10 is a table showing the result of evaluation of effects of precious metals in the base catalyst layer;

FIG. 11 is a table showing the result of evaluation of effects of the weight of precious metal in the base catalyst layer;

FIG. 12 is a table showing the result of evaluation of sulfur poisoning of various sample catalysts according to the invention;

FIG. 13 is a table showing the result of evaluation of effects of wash-coated amount of the catalyst layers;

FIG. 14 is a table showing the result of evaluation of effects of base material of the base catalyst layer;

DETAILED DESCRIPTION OF THE PREFERED EMBODIMENTS

Figure 1:
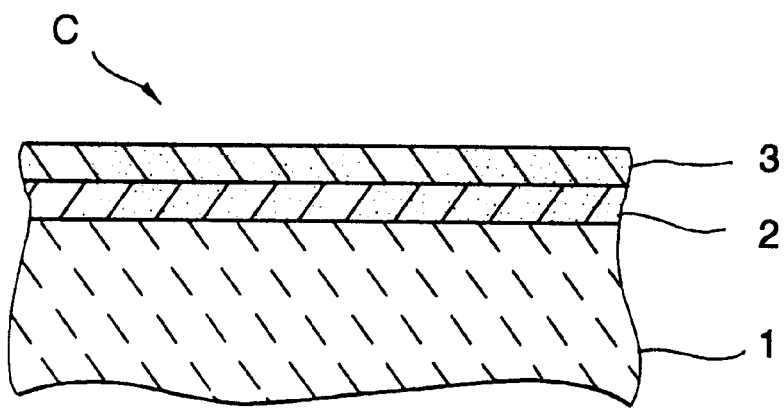
FIG. 1 is a fragmentary sectional view of a catalyst C for purifying exhaust gas according to an embodiment of the present invention.

A catalyst C in accordance with an embodiment of the invention of which the physical structure is shown in FIG. 1 is placed in an exhaust line (not shown) of a lean-burn engine of a motor vehicle. The catalyst C is capable of purifying emissions into the atmosphere as air pollution materials, such as hydrocarbons (HC), carbon monoxide (CO) and oxides of nitrogen (NOx) while the engine operates with a stoichiometric air-fuel mixture at a theoretical air-to-fuel (A/F) ratio, and also capable of purifying Nox in exhaust gas efficiently while the engine operates with a lean fuel mixture. Specifically, the catalyst C is suitably used, in particular, for purifying NOx produced by burning a lean fuel mixture in which the concentration of oxygen is between 4 or 5% to 20% and the air-to-fuel (A/F) ratio is greater than 18.

Catalyst C includes a honeycomb bed or carrier 1 made of cordierite having an excellent heat resistance. The honeycomb carrier 1 bears two catalyst layers; namely an base or base catalyst layer 2 and an over or over catalyst layer 3. The base catalyst layer 2 contains platinum (Pt) and barium (Ba) as an alkaline earth metal which are supported by alumina. Strontium (Sr) can also be used as the alkaline earth metal in place of the barium. Rhodium (Rh) and/or palladium (Pd) can be added to the base catalyst layer 2 besides platinum (Pt). Either Ceria or zeolite can be used instead of alumina. Further, any combination of two of the three materials, and titanium oxide ($TiO_2$) can be used instead of alumina. It is desirable that the amount of platinum (Pt) in the base catalyst layer is 1.0 to 6.0 gram per one litter of the base catalyst.

Over catalyst layer 3 contains platinum (Pt) as a precious metal and zeolite. The over catalyst layer 3 may contain as precious metals platinum (Pt) and rhodium (Rh) of a weight ratio of, desirably, greater than 0.3. The over catalyst layer may further contain barium (Ba) added as an alkaline earth metal as like in the base catalyst layer 2. A content of impurities should be less than 1% in the over catalyst layer 3.

In this embodiment, platinum (Pt) contained as a precious metal in the over catalyst layer 3 activates nitrogen oxides (NOx) and hydrocarbons (HC) in exhaust gas and then the activated nitrogen oxides (NOx) are reduced to a nitrogen dioxide (NO2) and the activated hydrocarbons (HC) are partially oxidized and/or cracked. In other words, the activated nitrogen oxides (NOx) and the activated hydrocarbons (HC) become easy to react in terms of energy. Thus, the platinum (Pt) as a precious metal in the over catalyst layer 3 facilitates a reducing reaction on nitrogen oxides (NOx) and an oxidizing reaction on hydrocarbons (HC), and hence the over catalyst layer 3 can accelerate both reducing reaction on nitrogen oxides (NOx) and oxidizing reaction on hydrocarbons (HC). In the case that rhodium (Rh) and platinum (Pt) are used as precious metals in the over catalyst layer 3, the rhodium (Rh) further facilitates the reducing reaction on nitrogen oxides (NOx).

In the base catalyst layer 2 contains platinum (Pt) and barium (Ba), the barium (Ba) causes the platinum as an activated species to disperse in the base catalyst layer. Due to the well-dispersed platinum (Pt) in the base catalyst layer 2, nitrogen oxides (NOx) reacts with a nitrogen dioxide ($NO_2$) and a partially oxidized hydrocarbon (HC) which are formed by the platinum (Pt) or the platinum (Pt) and rhodium (Rh) in the over catalyst layer 3, so as to be decomposed and purified. Therefor, the NOx purification ratio of the catalyst C is more improved. When the content of precious metal in the over catalyst layer 3 is increased than that in the base catalyst layer 2, a furthermore improved NOx purification ratio is provided.

In preparing the catalyst C, it is preferable to form the base catalyst layer 2 by impregnation and the over catalyst layer by spray-drying. Specifically, binder particles and powdered alumina which may bear no precious metals or a little are mixed to form slurry. This slurry is then wash-coated on the honeycomb carrier 1. The spray-drying, which is also called spray solidification, comprises the steps of preparing slurry of a mixture of powdered zeolite, a platinum solution and water, spraying the slurry into thermal atmosphere and baking and drying the sprayed particles to yield powders of catalyst material. The powders are mixed with binder particles to make slurry, then the slurry is wash-coated over the base catalyst layer 2 and dried and baked to form the over catalyst layer 3. After this, both base catalyst layer 2 and over catalyst layer 3 are dried and baked after impregnated with a platinum solution and thereafter with a barium solution. By way of this process, not only the base catalyst layer 2 but also the over catalyst layer 3 are impregnated with platinum and barium.

As described above, the base catalyst layer 2 and the over catalyst layer 3 bear precious metals as activated species in different bearing mechanisms. In the base catalyst layer 2, the particle size of the platinum (Pt) is smaller than that in the over catalyst layer 3, the smaller size of platinum (Pt) particles is more effective in purification of NOx, in particular, in the case that the composition of exhaust gas is changeable. On the other hand, in the over catalyst layer 3 formed by the spray-drying, the particle size of platinum (Pt) particles is relatively large, which yields an enhanced effect of purifying emissions of hydrocarbons (HC), a carbon monoxide (CO) and nitrogen oxides (NOx) while the engine operates under an ordinary operating state. In other words, the catalyst C thus structured is designed and adapted to work under a wide range of temperature at which activation starts and a wide range of composition of exhaust gas.

The following description will be directed to catalysts embodying the present invention by way of example. In the following examples, the catalysts I–V and a comparative catalyst VI were prepared by forming each ones of base and over catalyst layers comprising different materials from one another.

Each catalyst having was prepared by forming two catalyst layers on a cordierite honeycomb carrier of a volume rate of 6 mil/400 cell and 380 to 470 g/l, preferably 420 g/l, in weight. The base catalyst layer was 40 weight % and the over layer was 5 weight %. Components of the base layers were different among the catalysts I–VI from one another. Similarly, components of the over layers were different among the catalysts I–VI from one another. Specifically, alumina without additives and non-complex standard ceria were mixed with alumina binder at a specified weight ratio of, for example, a mixture of alumina and ceria:alumina binder=5 to 9:1. The mixture of alumina, ceria and alumina binder was wash-coated on the honeycomb carrier so as to amount 40 weight % with respect to the weight of the honeycomb carrier. Then the wash-coated mixture layer was dried for 2 hours at 150° C. and baked for 2 hours at 500° C. to form the base layer. Subsequently, the over layer was formed over the base layer. In order to form the over layer, distilled water was added to a mixture of a solution of dinitro-diamine platinum and a solution of rhodium nitrate and zeolite to form slurry. In this instance, the weight ratio of platinum (Pt) to rhodium (Rh) was 75:1. The slurry was dried by spray-drying and baked for 2 hours at 500° C. to form powders. The powders were mixed with alumina binder to form slurry. This slurry had a weight ratio of the mixture of platinum (Pt), rhodium (Rh) and zeolite:alumina binder=4 to 9:1. The slurry was wash-coated over the base layer having coated on the honeycomb carrier so as to amount 5 weight % with respect to the weight of the honeycomb carrier. Then the wash-coated layer was dried for 2 hours at 150° C. and baked for 2 hours at 500° C. to form the over catalyst layer 3. Thereafter, both base and over layers were impregnated with a solution of dinitro-diamine platinum and a solution of rhodium nitrate, and then dried for two hours at 150° C. and baked for 2 hours at 500° C. to form the catalyst layer. A solution of barium acetate may be used instead of the solution of barium nitrate with an effect of an increased degree of platinum dispersion so as to keep a small particle size.

In Example I, both base and over catalyst layers include platinum (Pt) and barium (Ba). The platinum (Pt) content was higher in the over catalyst than in the base layer, while the barium (Ba) content was the same in both catalyst layers.

In Example II, both base and outer catalyst layers contained platinum (Pt), rhodium (Rh) and barium (Ba). The rhodium (Rh) content was higher in the over catalyst than in the base layer, while the platinum (Pt) and barium (Ba) contents were the same in both catalyst layers.

In Example III, platinum (Pt) and barium (Ba) contents were the same in both catalyst layers.

In Example IV, both base and over catalyst layers contained platinum (Pt) and barium (Ba). The platinum (Pt) content was less in the over catalyst layer than in the base layer.

In Example V, only alumina was used as a coated material of the base layer, and the rest of the catalyst were the same as the catalyst of Example I.

A comparative catalyst VI was the same in structure as the catalyst of Example I except for absence of barium (Ba) in each of the base and over catalyst layers.

In any catalysts described above, the amount of activated species such as platinum (Pt) was given by the content per one litter of catalyst. The content of binder was 10 weight % in the base catalyst layer and 20 weight % in the over catalyst layer.

Evaluation of Catalysts

Two samples for each of those example catalysts and comparative catalyst were prepared to evaluate the catalysts by measuring NOx purification ratios. The first sample was a fresh catalyst before thermal-aging, and the second sample was heated for 50 ° hours at 900° C. The NOx purification ratio was measured by use of a fixed bed-flow through type reactor on which a sample was disposed. Preheated exhaust gas equivalent to one that was produced by burning an air-to-fuel mixture of an air-to-fuel ratio of 22 was passed through the fixed bed-flow through reactor. The components of the catalyst layers of each catalyst and the test results about the NOx purification ratio is shown in a table in FIG. 6, and the composition of exhaust gas used is shown in a table in FIG. 7.

As apparent in the table in FIG. 6, the catalyst of Example I containing barium (Br) yields an NOx purification ratio higher than the comparative catalyst before and after thermal-aging. This proves that platinum (Pt) is well dispersed in the catalyst layers under the existence of barium (Ba), resulting in the higher NOx purification ratio due to a reaction of the well-dispersed platinum (Pt) on nitrogen oxides (NOx). Comparing the catalyst of Example I with catalysts of Examples III and IV, respectively, it is proved that a higher content of platinum (Pt) in the over catalyst layer than in the base catalyst layer yields a higher NOx purification ratio.

Comparing the catalyst of Example II with the catalyst of Example III, it is proved that the NOx purification ratio is further improved when a rhodium (Rh) is contained more in the over layer than in the base layer.

Amount of Precious Metals in Over Catalyst Layer

Figure 2:
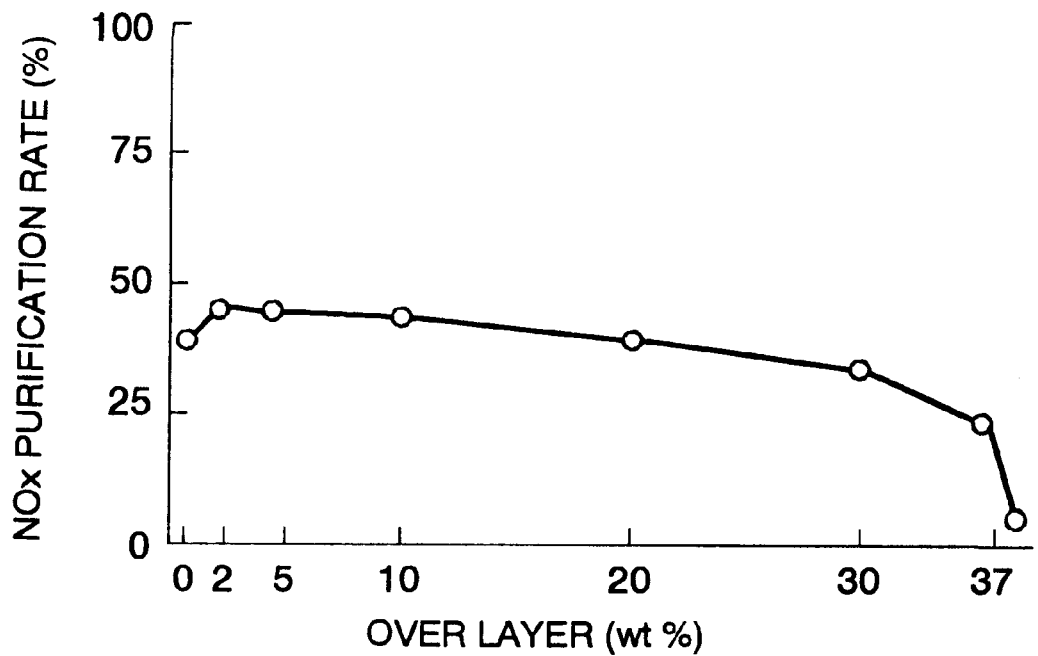
FIG. 2 is a graph showing the relation between the weight ratio of over catalyst layer of the catalyst and the purification ratio of NOx in exhaust gas.

FIG. 2 shows the results obtained from the tests in connection with NOx purification rate for various weight amounts of the over catalyst layer. In the case that the contents of precious metals is higher in the over catalyst layer than in the base catalyst layer. Measurements of NOx purification ratio were made in the same method as described above. The weight amount of platinum (Pt) was 2 g/l in the base catalyst layer and 2.3 g/l in over catalyst layer. The total weight amount of barium (Ba) was 30 g/l for the whole catalyst. The support material in the base catalyst layer comprises alumina and ceria, the weight ratio of which was one to one (alumina:ceria=1:1) and the support material in the over catalyst layer was zeolite only. The base and over catalyst layers were coated so that they contain the total amount of the support materials of 40 weight %. The fresh catalyst before thermal-aging, The utilization was made of exhaust gases at 350° C. with different compositions shown in the table in FIG. 7 in the tests.

As apparent from FIG. 2, it is proved that the catalyst having an over catalyst layer of a weight between 1 and 30 weight %, preferably between 2 and 10 weight %, and a weight ratio of the over catalyst layer to a base catalyst layer of 1/40 to 3/4, preferably 1/20 to 1/4 yields a high NOx purification ratio.

Effects of Composition of Each Catalyst Layer

Figure 3:
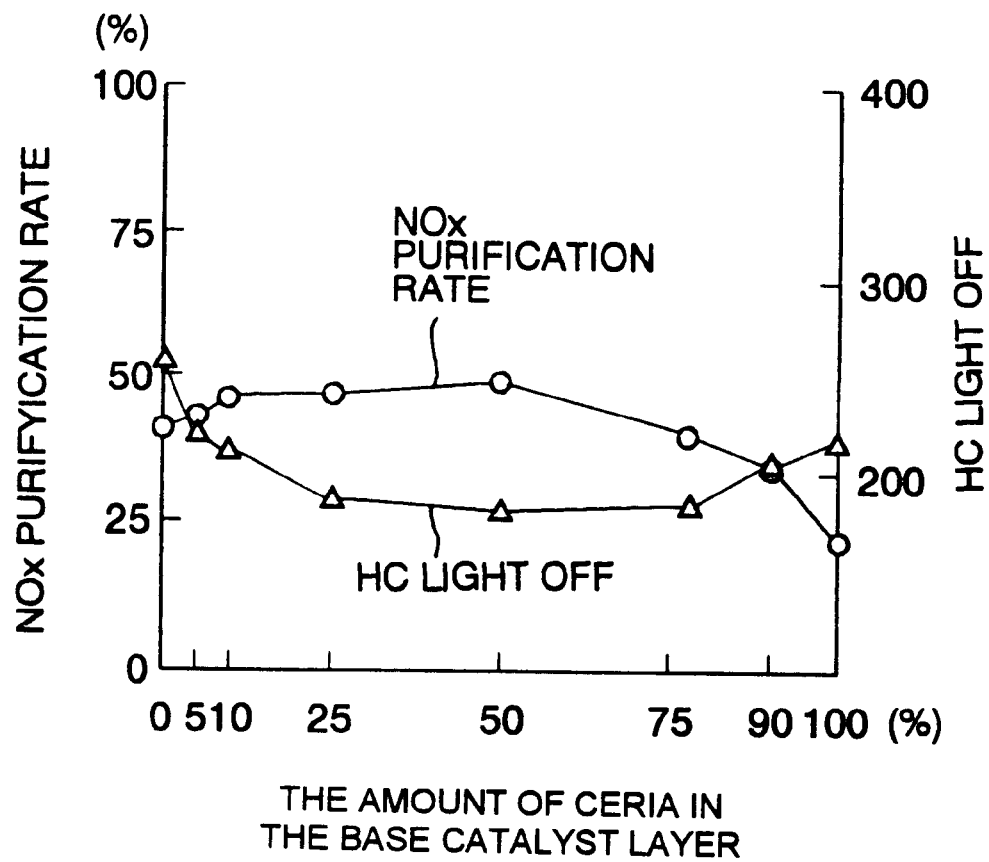
FIG. 3 is a graph showing the relation between the weight amount of ceria in the base catalyst layer of the catalyst and the purification ratio of NOx in exhaust gas

Regarding the effects of composition of the base layer, a change in the amount of ceria with respect to a change in NOx purification ratio in exhaust gas and a change in HC light off amount (T50) in exhaust gas at λ=1 are shown in FIG. 3. The catalysts tested was the same in composition as the catalyst of Example I except the amount of alumina and ceria was altered. A fresh catalyst before thermal-aging and the exhaust gas indicated in the table in FIG. 7 at 350° C. were used for the test. From FIG. 3, it is proved that the amount of ceria should preferably be 10 to 90 weight % in terms of light off and 10 to 75 weight % in terms of NOx purification rate.

Table in FIG. 8 shows NOx purification rates for a catalysts having a base catalyst layer containing alumina and ceria in a weight ratio of 1 to 1 and a catalyst having a base catalyst layer containing zeolite of an MFI-type, Y-type or β-type. According to the table in FIG. 8, it is found that while zeolite may be employed as a support material in the base catalyst layer in place of alumina and ceria, the combination of alumina and ceria still yields a particularly excellent result.

In a table in FIG. 9, NOx purification ratio is shown for catalysts of Example I which has an over catalyst layer containing zeolite (MFI-type), a combination of ceria and alumina, a combination of zeolite and alumina, alumina or ceria, as the support material. The weight ratio of ceria or alumina used together with zeolite was 30%. As apparent from the table in FIG. 8, it is proved that, while alumina and ceria may be replaced with zeolite as a support material in the over catalyst layer, zeolite still yields a particularly excellent result even after thermal-aging.

Quantitative Effects of Pt and Pd in Base Catalyst Layer

Table in FIG. 10 shows NOx purification ratios, before and after thermal-aging, of catalysts having base catalyst layers containing different amounts of platinum (Pt), respectively. Each catalyst was the same in composition as the catalyst of Example I except the amount of platinum (Pt) and disposed on a honeycomb carrier of a weight 420 g/l.

From the table in FIG. 10, it is proved that favorable NOx purification ratio is provided before thermal-aging as long as the catalyst has a base catalyst layer containing platinum of an amount not less than 0.5 g/l. However, in consideration of NOx purification rate after thermal-aging, it is preferable to employ the amount of platinum (Pt) between 1.0 and 6.0 g/l which are equivalent to 1/168 to 1/42 in weight ratio with respect to the weight of the base catalyst layer when the weight a honeycomb carrier is 420 g/l. This is because the NOx purification ratio seems to decrease due to sintering resulting from thermal aging when the weight amount of platinum (Pt) in the base catalyst layer is greater than 6.0 g/l. Further, NOx purification ratios before and after thermal aging of catalysts having base catalyst layers containing different amounts of palladium and a fixed amount, namely 2.0 g/l, of platinum are shown in a table in FIG. 11.

From the table in FIG. 11, it is proved that favorable NOx purification ratio is provided for the catalysts, before and after thermal-aging, as long as the amount of palladium (Pd) in the base layer is between 1.0 and 6.0 g/l.

Sulfur Poisoning

For sulfur poisoning examination, sample catalysts As–Cs and comparative catalyst Ac–Cc were prepared. These catalysts were comprised of base catalyst layers only which contain different amounts of platinum (Pt), or platinum (Pt) and palladium (Pd), from one another. These sample catalysts As–Cs were the same in composition as the catalyst of Example I except the amount of platinum (Pt), or platinum (Pt) and palladium (Pd). Comparative catalysts Ac to Cc were comprised of base catalyst layers, respectively, which were the same in composition as the base layer of the catalyst of Example I and, however different in the amount of precious metals from one another. Each of the sample catalysts As–Cs and the conparative catalysts Ac–Cc were treated in the gas (set forth in Table in FIG. 7) added with 50 ppm of $SO_2$ for 30 minutes at 400° C. Measurements of NOx purification rate were made in the same manner as described above and resulted as indicated in the following table in FIG. 12.

From the table in FIG. 12, it is found that a favorable NOx purification ratio is provided by the catalysts having an over catalyst layer. This is because the platinum (Pt) and palladium (Pd) in the base catalyst layer are protected against sulfur poisoning by the over catalyst layer.

Effects of Weight Ratio of Pt to Rh in Over Catalyst Layer

Figure 4:
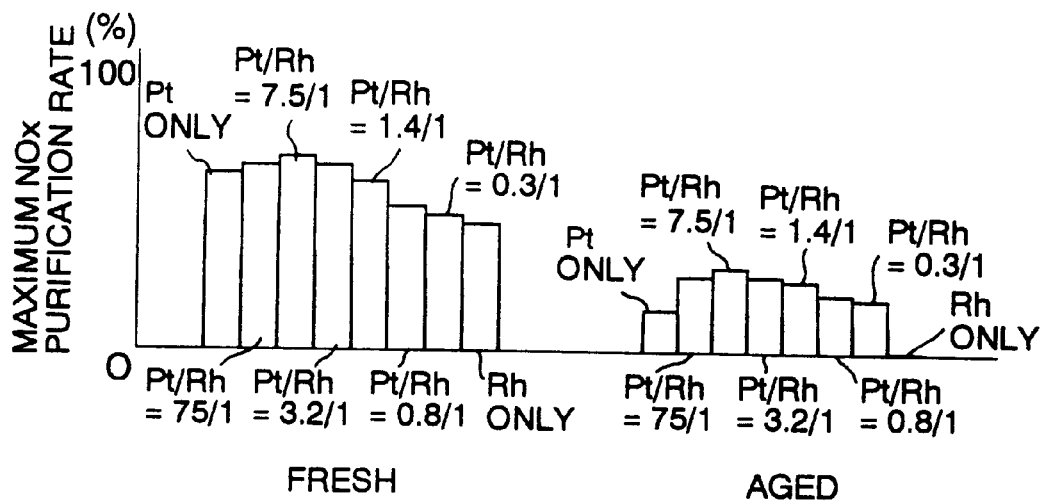
FIG. 4 is a graph showing the relation between the change in weight ratio of platinum to rhodium in the over catalyst layer of the catalyst and the maximum purification ratio of NOx in exhaust gas.
Figure 5:
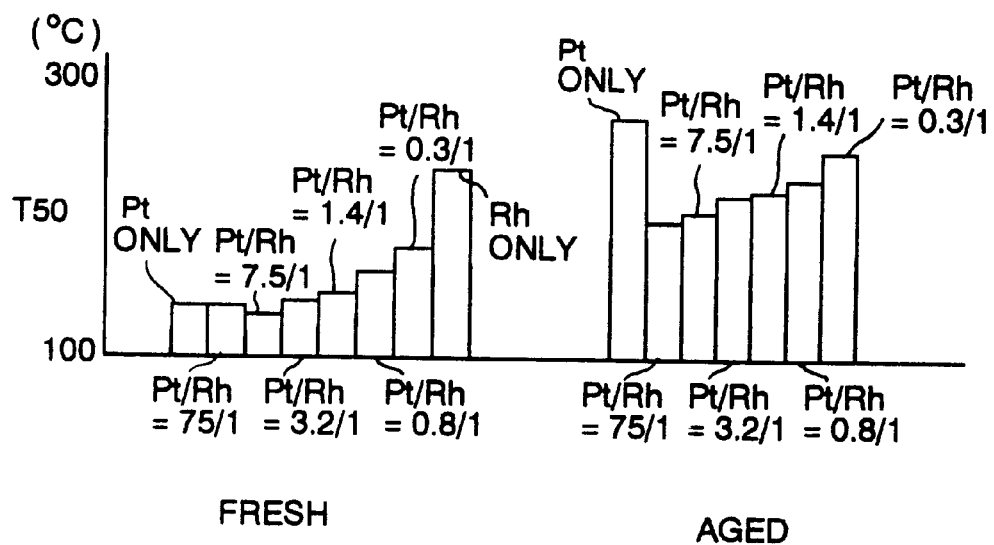
FIG. 5 is a graph showing the relation between the change in weight ratio of platinum to rhodium in the over catalyst layer of the catalyst and the purification ratio of HC in the exhaust gas.

Evaluation was made regarding maximum NOx purification ratio, before and after thermal aging, for catalysts containing in catalyst layers platinum (Pt) and rhodium (Rh) different in weight ratio from one another and the results are shown in FIG. 4. Further evaluation of HC purification rate, specifically 50% purification for the fresh catalyst of the same content of platinum (Pt) and palladium (Pd) as those above and 50% purification for the same catalyst after thermal aging were made and the results are shown in FIG. 5. In this instance, each catalyst was comprised of a 40 weight % of base catalyst layer and 5 weight % of over catalyst layer. The gas used in the evaluation test was equivalent to exhaust gas produced by burning a fuel mixture of an air-to-fuel ratio of 22 which was the same as used in the tests described above. It was also found that there was no suitable temperature at which the catalyst purifying 50% of total HC after thermal aging when containing rhodium only in the over catalyst layer.

From FIGS. 4 and 5, it is found that NOx and HC purification ratios are further improved by catalysts containing platinum (Pt) only or platinum (Pt) and palladium (Pd) of a weight ratio Pt/Rh greater than 0.3, preferably between 75 and 3.2, in the over catalyst layer.

Effects of Amount of Wash-Coated Catalyst Layers

Evaluation of NOx purification ratio and the flaking amount of catalyst layer were made for fresh catalysts with different amounts of base and over catalyst layers wash coated, and the results are shown in a table in FIG. 13. The evaluation of NOx purification rate was made in the same manner as described above. In the evaluation test of the flaking amount of catalyst layers, an acoustic method in which ultrasonic vibrating was applied to a sample catalyst coated on a honeycomb carrier for 180 minutes was employed. The flaking degree was calculated as a rate in percentage of the difference in weight amount between the base and over catalyst layers before and after the test relative to the weight amount of the base and over catalyst layers before the test. In this instance, the honeycomb carrier was made of cordierite and had a volume ratio of 6 mil/400 cell. From the table in FIG. 13, it is clearly found that, while the flaking amount of catalyst increases with an increase in the total amount of wash-coated catalyst layers, favorable NOx purification ratio is yielded by a catalyst comprising the wash coated catalyst layers of a weight ratio of the total amount between 20 and 160%.

Effects of Alkaline Earth Metal in Base Catalyst Layer.

The following description will be directed to sample catalysts which contain strontium (Sr) as an alkaline earth metal instead of barium (Ba) in its base catalyst layer.

A sample catalyst as a first Example X1 was prepared. A mixture of alumina, ceria and hydrated alumina binder in a weight ratio of 46.5:46.5:7 was added with water and nitric acid to prepare slurry which was adjusted to have a pH of 3.5 to 4. A honeycomb carrier made of cordierite was dipped in the slurry and dried at 150° C. for 2 hours after blowing off an excess of the slurry and then baked at 500° C. for 2 hours. This process was repeated twice to form a catalyst containing 78 g/l of alumina and 78 g/l of ceria impregnated in a honeycomb carrier, each of the alumina and ceria accounting an approximately 37 weight % of the weight of the honeycomb carrier. On the other hand, a solution of dinitro-diamine platinum and a solution of rhodium nitrate were mixed so as to contain platinum and rhodium in a ratio Pt/Rh of 75. The mixture solution was further added with water and a specified amount of MFI type of powdered zeolite to prepare slurry. The slurry was adjusted so as to contain platinum (Pt) and rhodium (Rh) of 24 g per 1 kg of zeolite. The slurry thus adjusted was dried by spray-drying and subsequently baked at 500° C. for 2 hours to provide powdered zeolite bearing platinum (Pt) and rhodium (Rh).

Further, slurry was prepared by mixing the powder zeolite, which bears platinum (Pt) and rhodium (Rh), and alumina binder in a weight ratio of 85:15. After dipping the honeycomb carrier previously prepared in the slurry, the honeycomb carrier was dried at 150° C. for 2 hours and further baked at 500° C. for 2 hours to prepare the honeycomb carrier bearing of zeolite which bears 20 to 22 g/l of platinum (Pt) and 20 to 22 g/l of rhodium (Rh), each being approximately 5 weight % of the honeycomb carrier.

The honeycomb carrier thus prepared by way of the above described process was impregnated with a solution of dinitro-diamine platinum and a solution of strontium acetate so as finally to bear 2 g/l of platinum (Pt) and 30 g/l of strontium (Sr). Thereafter, the honeycomb catalyst was dried at 150° C. for 2 hours and baked at 500° C. for 2 hours to complete the sample catalyst of Example X1.

As a sample catalyst of Example X2, a catalyst was prepared by replacing the strontium acetate in the sample catalyst of Example X1.

Evaluation of NOx removal rate, which was defined by a rate of the total amount of purified NOx and adsorbed NOx, was made for the catalysts of Examples X1 and X2 with respect to simulated exhaust gas at 300° C. As a result, a NOx removal rate of 98% was yielded by the fresh catalyst of Example X2, and a NOx removal rate of 95% by the fresh catalyst of Example X1. This result proves that strontium (Sr) in the base catalyst layer provides an effect of purifying NOx as an alkaline earth metal comparatively to barium (Ba).

Effects of Precious Metal Bearing Material of Base Catalyst Layer

In order to examine and evaluate the effect of a material bearing a precious metal or precious metals in the base catalyst layer, a sample catalyst of Example Y1 was prepared in the same way as described directly above in connection with the evaluation of NOx removal rate. Titanium oxide ($TiO_2$) and hydrated alumina binder were mixed in a weight ratio of 9:1. This mixture was then added with water and nitric acid to prepare slurry of which a pH was adjusted to be between approximately 3.5 and 4. As was previously described, a honeycomb carrier made of cordierite was dipped in the slurry and dried at 150° C. for 2 hours after blowing off an excess of the slurry and then baked at 500° C. for 2 hours. This process was repeated twice to form a catalyst containing 126 g/l of titanium oxide ($TiO_2$) impregnated in the honeycomb carrier, the titanium oxide ($TiO_2$) accounting an approximately 30 weight % of the weight of the honeycomb carrier. On the other hand, a solution of dinitro-diamine platinum and a solution of rhodium nitrate were mixed so as to contain platinum (Pt) and rhodium (Rh) in a ratio Pt/Rh of 75. The mixture solution was further added with water and a specified amount of MFI type of powdered zeolite MFI type:for example 25m-5 supplied by Mobil Oil Corporation) to prepare slurry. The slurry was adjusted so as to contain 24 g of platinum (Pt) and rhodium (Rh) per 1 kg of zeolite. The slurry thus adjusted was dried by spray-drying and subsequently baked at 500° C. for 2 hours to provide powdered zeolite bearing platinum (Pt) and rhodium (Rh).

Further, slurry was prepared by mixing the powder zeolite, which bears platinum (Pt) and rhodium (Rh), and alumina binder in a weight ratio of 85:15. After dipping the honeycomb carrier previously prepared in the slurry, the honeycomb carrier was dried at 150° C. for 2 hours and further baked at 500° C. for 2 hours to prepare the honeycomb carrier bearing zeolite which bears 20 to 22 g/l of platinum (Pt) and 20 to 22 g/l of rhodium (Rh), each being approximately 5 weight % of the honeycomb carrier.

The honeycomb carrier thus prepared was impregnated with a solution of dinitro-diamine platinum and a solution of strontium acetate so as finally to bear 6 g/l of platinum (Pt) and 30 g/l of barium (Ba). Thereafter, the honeycomb catalyst was dried at 150° C. for 2 hours and baked at 500° C. for 2 hours to complete the sample catalyst of Example Y1.

A sample catalyst as Example Y2 was separately prepared. The sample catalyst contained alumina and ceria ($Al_2O_3+CeO_2$) of a weight ratio 1:1 instead of titanium oxide of Example Y1 described above which amount 168 g/l which is approximately 30 weight % of the honeycomb carrier. Another sample catalyst of Example Y3 was prepared, which contained alumina ($Al_2O_3$) instead of titanium oxide. Everything of the sample catalysts of Examples Y2 and Y3 was just the same as the catalyst of Example Y1 except the above replacement.

Evaluation regarding NOx purification ratio was also made for the three sample catalysts of Examples Y1, Y2 and Y3, and the results are shown in a table in FIG. 14. Exhaust gas used employed for the evaluation tests of NOx purification rate of these fresh catalysts was simulated so as to be equivalent to exhaust gas produced by burning a fuel mixture of an air-to-fuel ratio of 22.

As apparent from the table in FIG. 14 showing NOx purification rates for the fresh catalysts of Example Y1–Y3, it is found that any one titanium oxide, a combination of alumina and ceria, and alumina can be employed as materials for bearing precious metals with an effect of providing favorable NOx purification ratio.

Catalyst for purifying exhaust gas of the invention, which has the over catalyst layer containing precious metals supported by zeolite and a base catalyst layer containing at least platinum and an alkaline earth metal, activates NOx and HC in exhaust gas with the precious metals in the over catalyst layer to make them reactive in terms of energy. Simultaneously, the alkaline earth metals in the base catalyst layer cause the platinum to disperse easily in the base catalyst layer. Under the existence of the favorably dispersed platinum, NOx is decomposed and purified by means of reaction with $NO_2$ and HC partially, which are provided by the over catalyst layer and easily reactive. Consequently, the catalyst of the invention is installed to an exhaust system of an engine with an effect of yielding an improved NOx purification rate for exhaust gas from the engine.

When the catalyst contains at least platinum as a precious metal in the over catalyst layer, it promotes reaction of reducing nitrogen oxides (NOx) and reaction of oxidizing hydrocarbons (HC) due to the existence of platinum (Pt), which always provides further improvement of NOx purification ratio. Further, when the catalyst contains both platinum and rhodium as precious metals in the over catalyst layer, it provides further promotion of reaction of reducing NOx, which also improve the NOx purifying rate. In this case, it is preferable for the catalyst to improve the NOx purifying rate that a weight ratio of platinum to rhodium (Pt/Rh) in the over layer is 0.3 or greater.

Platinum may be supported by alumina, ceria or zeolite in the base catalyst layer. Further, either palladium or rhodium may be contained as a precious metal in addition to platinum in the base catalyst layer. Catalyst may contain 1.0–6.0 g of platinum per one litter of the catalyst, which remains favorable NOx purification ratio even after thermal aging.

In order to evaluate the NOx removal rate of the exhaust gas purifying catalyst of the invention, various sample catalysts Z1–Z4 and a comparative catalyst Zc were prepared.

A sample catalyst as a first Example Z1 was prepared. A mixture of alumina, ceria and hydrated alumina binder in a weight ratio of 46.5:46.5:7 was added with water and nitric acid to prepare slurry which was adjusted to have a pH of approximately 3.5 to 4. A honeycomb carrier having a volume ratio of 6 mil/400 cell made of cordierite and a weight of 380 to 470 g/l was dipped in the slurry. After blowing off an excess of the slurry from the honeycomb carrier, it was dried at 150° C. for 2 hours and then baked at 500° C. for 2 hours. This process was repeated twice to form a catalyst containing 78 g/l of alumina and 78 g/l of ceria, each of the alumina and ceria accounting an approximately 37 weight % of the honeycomb carrier. On the other hand, a solution of dinitro-diamine platinum and a solution of rhodium nitrate were mixed so as to contain platinum and rhodium in a ratio Pt/Rh of 75. The mixture solution was further added with water and a specified amount of MFI type of powdered zeolite to prepare slurry. This slurry was adjusted so as to contain 24 g of the total weight of platinum (Pt) and rhodium (Rh) per 1 kg of zeolite. The slurry thus adjusted was dried by spray-drying and subsequently baked at 500° C. for 2 hours to provide powdered zeolite bearing platinum (Pt) and rhodium (Rh).

Further, slurry was prepared by mixing the powder zeolite, which bears platinum (Pt) and rhodium (Rh), and alumina binder in a weight ratio of 85:15. After dipping the honeycomb carrier previously prepared in the slurry, the honeycomb carrier was dried at 150° C. for 2 hours and further baked at 500° C. for 2 hours to prepare the honeycomb carrier bearing of zeolite which bears 20 to 22 g/l of platinum (Pt) and rhodium (Rh), which is approximately 5 weight % of the honeycomb carrier.

The honeycomb carrier thus prepared by way of the above described process was impregnated with a solution of dinitro-diamine platinum and a solution of sodium acetate so as finally to bear 2 g/l of platinum (Pt) and 30 g/l of sodium (Na). Thereafter, the honeycomb catalyst was dried at 150° C. for 2 hours and baked at 500° C. for 2 hours to complete the sample catalyst of Example Z1.

Sample catalysts containing potassium acetate, strontium acetate and lithium acetate, instead of sodium acetate of Example Z1 described above, were prepared as Examples Z2, Z3 and Z4, respectively.

Further, a sample catalyst Zc containing barium acetate instead of sodium acetate of Example Z1 described above was prepared as a comparative one.

Except the above replacement, the sample catalysts of Examples Z2–Z3 and comparative catalyst Zc were just the same in composition as the catalyst of Example Z1.

Figures 15, 16:
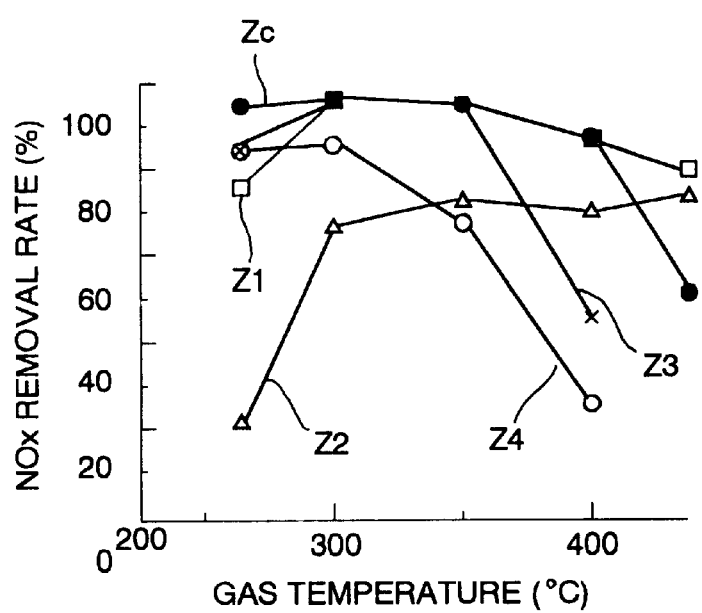
FIG. 15 is a table showing compositions of simulated exhaust gas used for NOx removal rate evaluation tests.
FIG. 16 is a table showing the result of NOx removal rate evaluation test for various sample catalysts according to another example of the invention.

Evaluation regarding NOx removal ratio was made for the five sample catalysts Z1–Z4 and Zc. Exhaust gases employed for the evaluation tests of NOx removal rate of these fresh catalysts was simulated so as to be equivalent to exhaust gases produced by burning fuel mixtures of air-to-fuel ratios of A/F=22 and 1=1, respectively, as set forth in table in FIG. 15. The NOx removal rate was measured by use of a fixed bed-flow through type reactor to which the simulated exhaust gases w preheated were alternately supplied. Specifically, the NOx removal rate was measured within a specified period of time from a change over from the exhaust gas equivalent to the exhaust gas equivalent to an exhaust gas produced by burning a fuel mixture of air-to-fuel ratios of 1=1. The NOx removal rate was calculated as the total of a NOx adsorption rate and a NOx purification rate for a sample catalyst saturated with NOx during supply of the exhaust gas equivalent to the exhaust gas by burning a fuel mixture of an air-to-fuel ratios of A/F=22. FIG. 16 shows NOx removal rates of the sample catalysts Z1–Z4 and Zc measured while the temperatures of the exhaust gases were changed between 250 and 450° C.

As apparent from FIG. 16, it is proved that, while a decline in NOx removal rate is encountered by the sample catalyst Z2 at lower exhaust temperatures, and by the sample catalysts Z3 and Z4 at higher exhaust temperatures, favorable NOx removal rates are provided for all of the sample catalysts Z1–Z4 at exhaust temperatures between 300 and 350° C. In particular, the sample catalysts Z1 and Z2 show NOx removal rates at a high exhaust gas temperature of approximately 450° C. higher than that of the comparative catalyst Zc.

It is to be understood that although the present invention has been described with regard to specific embodiments thereof, however, it should be noted that the invention is no way limited to the details of the illustrated structures but changes and modifications may be made without departing from the accompanying claims.

What is claimed is:

1. A catalyst for purifying exhaust gas from a lean-burn engine with two catalyst coating layers on a carrier by reacting NOx in the exhaust gas with HC in an excessive oxygen atmosphere, comprising:
    a base catalyst coating layer directly disposed on a carrier, said base catalyst coating layer containing at least platinum (Pt) and at least one alkaline earth metal or alkaline metal; and
    an over catalyst coating layer disposed over said base catalyst coating layer, said over catalyst coating layer containing zeolite and a noble metal.

2. An exhaust gas purifying catalyst as defined in claim 1, wherein said over catalyst coating layer contains at least platinum (Pt) as precious metal.

3. An exhaust gas purifying catalyst as defined in claim 1, wherein said over catalyst coating layer contains platinum (Pt) and rhodium (Rh) as precious metals.

4. An exhaust gas purifying catalyst as defined in claim 3, wherein a weight ratio of said platinum (Pt) to said rhodium (Rh) is greater than 0.3.

5. An exhaust gas purifying catalyst as defined in claim 4, wherein a weight ratio of said platinum (Pt) to said rhodium (Rh) is between 3.2 and 75.

6. An exhaust gas purifying catalyst as defined in claim 1, wherein said base catalyst coating layer contains one of alumina, ceria and zeolite for supporting said platinum.

7. An exhaust gas purifying catalyst coating as defined in claim 6, wherein said base catalyst layer contains 1.0 to 6.0 grams of said platinum per one liter of said catalyst.

8. An exhaust gas purifying catalyst as defined in claim 6, wherein said base catalyst coating layer further contains palladium (Pd).

9. An exhaust gas purifying catalyst as defined in claim 6, wherein said base catalyst coating layer further contains rhodium (Rh).

10. An exhaust gas purifying catalyst as defined in claim 1, wherein said over catalyst coating layer contains an alkaline earth metal.

11. An exhaust gas purifying catalyst coating as defined in claim 10, wherein said base catalyst layer contains 1.0 to 6.0 grams of said platinum per one liter of said catalyst.

12. An exhaust gas purifying catalyst as defined in claim 10, wherein said alkaline earth metals includes barium (Ba).

13. An exhaust gas purifying catalyst as defined in claim 1, wherein said base catalyst coating layer contains at least one of the group of barium (Ba) and strontium (Sr).

14. An exhaust gas purifying catalyst as defined in claim 1, wherein said base catalyst coating layer contains at least one of titanium oxide, alumina and ceria.

15. An exhaust gas purifying catalyst as defined in claim 1, wherein said catalyst purifies exhaust gas from a lean-burn engine by reacting NOx in the exhaust gas with HC in and excessive oxygen atmosphere containing more than 5 weight % of oxygen ($O_2$).

16. A catalyst for purifying exhaust gas from a lean-burn engine with two coating layers on a carrier by reacting NOx in the exhaust gas with HC in an excessive oxygen atmosphere, comprising:

a base catalyst coating layer directly disposed on a carrier, said base catalyst coating layer containing at least platinum (Pt) and barium (Ba) by which said platinum (Pt) is supported in a high dispersion condition; and an over catalyst coating layer disposed over said base catalyst coating layer, said over catalyst coating layer containing zeolite and a noble metal and oxidizing said NOx and HC so as to cause easy reaction of said NOx and HC with each other.

* * * * *